(12) United States Patent
Tsuda et al.

(10) Patent No.: US 11,533,663 B2
(45) Date of Patent: Dec. 20, 2022

(54) PAGING AREA UPDATE TECHNIQUE FOR REDUCING POWER CONSUMPTION OF A WIRE DEVICE MOVING IN AIR

(71) Applicant: Sony Corporation, Tokyo (JP)

(72) Inventors: Shinichiro Tsuda, Kanagawa (JP); Naoki Kusashima, Kanagawa (JP); Hiromasa Uchiyama, Tokyo (JP); Yifu Tang, Kanagawa (JP)

(73) Assignee: Sony Corporation, Tokyo (JP)

(\*) Notice: Subject to any disclaimer, the term of this patent is extended or adjusted under 35 U.S.C. 154(b) by 0 days.

(21) Appl. No.: 17/042,861

(22) PCT Filed: Feb. 21, 2019

(86) PCT No.: PCT/JP2019/006453
§ 371 (c)(1),
(2) Date: Sep. 28, 2020

(87) PCT Pub. No.: WO2019/193858
PCT Pub. Date: Oct. 10, 2019

(65) Prior Publication Data
US 2021/0022054 A1    Jan. 21, 2021

(30) Foreign Application Priority Data
Apr. 5, 2018  (JP) ............................ JP2018-072966

(51) Int. Cl.
*H04W 36/00*  (2009.01)
*H04W 4/029*  (2018.01)
(Continued)

(52) U.S. Cl.
CPC ..... *H04W 36/00835* (2018.08); *H04W 4/029* (2018.02); *H04W 8/02* (2013.01); *H04W 48/16* (2013.01); *H04W 68/02* (2013.01)

(58) Field of Classification Search
CPC ..... H04W 68/02; H04W 68/00; H04W 84/06; H04W 88/02; H04W 88/08; H04W 36/00;
(Continued)

(56) References Cited

U.S. PATENT DOCUMENTS 9,191,911 B2 * 11/2015 Sigg et al. ............ H04W 60/04
2014/0092871 A1    4/2014 Wang
(Continued)

FOREIGN PATENT DOCUMENTS

CN    106605430 A      4/2017
CN    108713222 A  * 10/2018  ............ H04B 7/185
(Continued)

OTHER PUBLICATIONS

International Search Report and English translation thereof dated Apr. 9, 2019 in connection with International Application No. PCT/JP2019/006453.
(Continued)

*Primary Examiner* — Meless N Zewdu
(74) *Attorney, Agent, or Firm* — Wolf, Greenfield & Sacks, P.C.

(57) ABSTRACT

A wireless communication device is provided which allows proper management of location information for a terminal moving in the air to reduce the power consumption of the terminal and to prevent the terminal from affecting communication.

A wireless communication device is provided which includes a determination unit that determines whether the device is a device moving on the ground or a device moving in the air, a neighboring cell determination unit that determines whether or not identification information of a paging area acquired through common information transmitted from a base station is the same as identification information of a paging area for which an update was performed last time
(Continued)

when the determination unit determines that the device is moving in the air, and a control unit that determines presence or absence of need for a paging area update on the basis of a condition for initiating a paging area update when the determination unit determines that the device is moving in the air.

16 Claims, 11 Drawing Sheets

(51) Int. Cl.
  *H04W 8/02* (2009.01)
  *H04W 48/16* (2009.01)
  *H04W 68/02* (2009.01)

(58) Field of Classification Search
  CPC ........... H04W 4/02; H04W 4/09; H04W 8/02; H04W 48/16; H04W 36/00835; H04W 48/20; H04W 60/04; H04W 68/06; H04W 64/00; H04W 88/00; H04W 68/12; H04W 4/42; H04W 4/50; H04W 4/18; H04W 8/08; H04W 8/16; H04W 48/00; H04W 36/0083; H04W 68/05; H04W 68/025; H04W 68/04; H04W 68/08; H04W 68/10; H04W 84/005; H04W 84/025; H04W 84/027; H04W 88/185; H04W 4/023; H04W 4/027; H04W 40/22; H04W 40/24; H04W 40/244; H04W 40/246; H04W 40/248; H04W 40/36; H04W 48/17; H04W 48/18; H04W 92/10; H04W 76/00; H04W 76/10; H04W 76/11; H04W 76/15; Y02D 30/70; Y02D 10/10; Y02D 30/00
  See application file for complete search history.

(56) References Cited

U.S. PATENT DOCUMENTS

| | | | | |
|---|---|---|---|---|
| 2017/0257842 | A1* | 9/2017 | Hessler et al. | H04W 68/005 |
| 2019/0268877 | A1* | 8/2019 | Tombas et al. | H04W 68/04 |
| 2020/0015196 | A1* | 1/2020 | Sivavakeesar et al. | H04W 68/02 |
| 2021/0297923 | A1* | 9/2021 | Wei et al. | H04W 36/32 |

FOREIGN PATENT DOCUMENTS

| | | | | |
|---|---|---|---|---|
| CN | 109218344 | A * | 1/2019 | H04L 29/08 |
| TW | 201742419 | A | 12/2017 | |

OTHER PUBLICATIONS

[No Author Listed], Summary on [99b#61][LTE/UAV] Identify potential solutions on mobility enhancement. 3GPP TSG RAN WG2 #100 R2-1713451. Ericsson (Rapporteur). Nov. 27-Dec. 1, 2017. 23 pages.

[No Author Listed], Mobility Enhancement using MR Triggering. 3GPP TSG-RAN WG2 Meeting #101 R2-1802706. LG Electronics Inc. Feb. 26-Mar. 2, 2018. 4 pages. URL:https://www.3gpp.org/ftp/tsg_ran/WG2_RL2/TSGR2_101/Docs/R2-1802706.zip.

[No Author Listed], Mobility enhancements for UAVs—reference altitude. 3GPP TSG-RAN WG2 Meeting #101 R2-1803349. Nokia, Nokia Shanghai Bell. Feb. 26-Mar. 2, 2018. 4 pages. URL:https://www.3gpp.org/ftp/tsg_ran/WG2_RL2/TSGR2_101/Docs/R2-1803349.zip.

[No Author Listed], Initial views on potential problems and solutions for aerial vehicles. 3GPP TSG RAN WG2 #98 R2-1704333. NTT Docomo, Inc. May 15-19, 2017. 5 pages.

[No Author Listed], Location based mobility enhancements for UAVs. 3GPP TSG RAN WG2 Meeting #101 R2-1803129. Sony. Feb. 26-Mar. 2, 2018. 4 pages. URL:https://www.3gpp.org/ftp/tsg_ran/WG2_RL2/TSGR2_101/Docs/R2-1803129.zip.

[No Author Listed], Discussion on identification of aerial UE. 3GPP TSG-RAN WG2 Meeting #101 R2-1803139. Sony. Feb. 26-Mar. 2, 2018. 4 pages. URL:https://www.3gpp.org/ftp/tsg_ran/WG2_RL2/TSGR2_101/Docs/R2-1803139.zip.

Ericsson, "Airborne status indication and related mobility enhancements", R2-1802788, 3GPP TSG-RAN WG2 101, Athens, Greece, Feb. 26-Mar. 2, 2018.

Huawei, HiSilicon, "Introduction of drone related SIBs for Aerial Vehicles for TS 36.331", R2-1802664, 3GPP TSG-RAN WG2 101, Athens, Greece, Feb. 26-Mar. 2, 2018.

Lenovo, Motorola Mobility, "Discussion on airborne status management for aerial UE", R2-1802305, 3GPP TSGRAN WG2 Meeting 101, Athens, Greece, Feb. 26-Mar. 2, 2018.

* cited by examiner

PAGING AREA UPDATE TECHNIQUE FOR REDUCING POWER CONSUMPTION OF A WIRE DEVICE MOVING IN AIR

CROSS-REFERENCE TO RELATED APPLICATIONS

This is a U.S. National Stage Application under 35 U.S.C. § 371, based on International Application No. PCT/JP2019/006453, filed in the Japanese Patent Office as a Receiving Office on Feb. 21, 2019, which claims priority under 35 U.S.C. § 119(a)-(d) or 35 U.S.C. § 365(b) to Japanese Patent Application Number JP2018-072966, filed in the Japanese Patent Office on Apr. 5, 2018, each of which applications is hereby incorporated by reference in its entirety.

TECHNICAL FIELD

The present disclosure relates to a wireless communication device, a communication device, and a communication control method.

BACKGROUND ART

The Universal Mobile Telecommunications System (UMTS), a third generation mobile communication system that has been widely used as a cellular technology, and Long Term Evolution (LTE), a fourth generation mobile communication system that is currently in widespread use, are constructed as systems that allow communication with terrestrial user equipment (UE), that is, wireless communication terminals moving on the ground.

Furthermore, unmanned aerial vehicles (UAVs) typified by drones that are expected to be utilized in the fields of agriculture and logistics and in times of disaster are attracting attention. In response to the growing popularity of UAVs, the Third Generation Partnership Project (3GPP) has also launched the study item (SI) "Enhanced LTE Support for Aerial Vehicles" in Rel-15 with the aim of providing a communication environment to UAVs. Cellular networks have been originally constructed with wireless communication devices moving on the ground in mind. Thus, the extension of mobility management due to a coverage environment different from that on the ground and the like have been discussed. This SI has been completed at 3GPP RAN #78 held in December 2017. At this meeting, the proposal of the work item (WI) "Enhanced LTE Support for Aerial Vehicles" has been approved.

Non-Patent Document 1 points out that the result is obtained that aerial UE moving in the air observes more surrounding cells than terrestrial UE on the ground. Further, Non-Patent Document 2 points out that aerial UE has handover characteristics different from those of terrestrial UE.

CITATION LIST

Non-Patent Documents

Non-Patent Document 1: R2-1704333, "Initial views on potential problems and solutions for aerial vehicles", May 3, 2017

Non-Patent Document 2: R2-1713451, "Summary on [99b #61] [LTE/UAV] Identify potential solutions on mobility enhancement", Nov. 16, 2017

SUMMARY OF THE INVENTION

Problems to be Solved by the Invention

Compared with terrestrial UE, aerial UE sees cells located far away. Thus, by maintaining connection with a cell located as far as possible in mobility management, an operation that allows a reduction in handover frequency is made possible. On the other hand, it is feared that a signal transmitted from aerial UE may interfere with many base stations, affecting communication with terrestrial UE.

Therefore, in the present disclosure, a new and improved wireless communication device, communication device, and communication control method are proposed which allow proper management of location information for a terminal moving in the air to reduce the power consumption of the terminal and to prevent the terminal from affecting communication.

Solutions to Problems

According to the present disclosure, a wireless communication device is provided which includes a determination unit that determines whether the device is a device moving on the ground or a device moving in the air, a neighboring cell determination unit that determines whether or not identification information of a paging area acquired through common information transmitted from a base station is the same as identification information of a paging area for which an update was performed last time when the determination unit determines that the device is moving in the air, and a control unit that determines presence or absence of need for a paging area update on the basis of a condition for initiating a paging area update when the determination unit determines that the device is moving in the air.

Further, according to the present disclosure, a communication device is provided which includes a transmission processing unit that transmits, through common information, an index related to a condition for a wireless communication device moving in the air to initiate a paging area update, in addition to identification information of a paging area to which the device belongs, and a wireless communication unit that receives information regarding the paging area update from the wireless communication device.

Further, according to the present disclosure, a communication control method is provided which includes determining by a device whether the device is a device moving on the ground or a device moving in the air, determining whether or not identification information of a paging area acquired through common information transmitted from a base station is the same as identification information of a paging area for which an update was performed last time upon determination that the device is moving in the air, and determining presence or absence of need for a paging area update on the basis of a condition for initiating a paging area update upon determination that the device is moving in the air.

Further, according to the present disclosure, a communication control method is provided which includes transmitting by a device, through common information, an index related to a condition for a wireless communication device moving in the air to initiate a paging area update, in addition to identification information of a paging area to which the device belongs, and receiving information regarding the paging area update from the wireless communication device.

Effects of the Invention

As described above, according to the present disclosure, a new and improved wireless communication device, communication device, and communication control method can be provided which allow proper management of location information for a terminal moving in the air to reduce the power consumption of the terminal and to prevent the terminal from affecting communication.

Note that the above effects are not necessarily limiting, and any of the effects described in the present description, or other effects that can be understood from the present description may be achieved together with the above effects or in place of the above effects.

DETAILED DESCRIPTION OF THE DRAWINGS

Mode for Carrying Out the Invention

Figure 1:
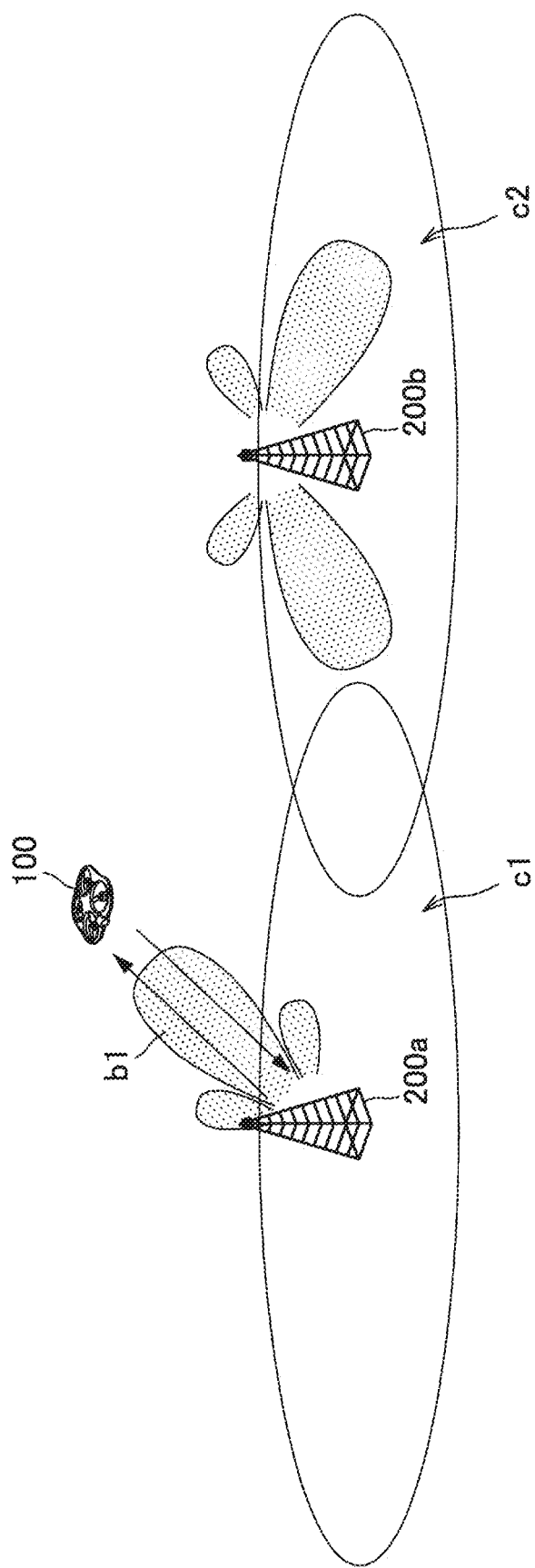
FIG. 1 is an explanatory diagram showing a configuration example of a communication system according to an embodiment of the present disclosure.

Hereinafter, a preferred embodiment of the present disclosure will be described in detail with reference to the accompanying drawings. Note that in the present description and the drawings, the same reference numerals are assigned to components having substantially the same functional configurations to avoid duplicated explanations.

Note that the description will be made in the following order.

1. Embodiment of the present disclosure
1.1. Background
1.2. Configuration example and operation example
2. Application examples
3. Summary

1. EMBODIMENT OF THE PRESENT DISCLOSURE

[1.1. Background]

First, a background to an embodiment of the present disclosure will be described.

As described above, the Universal Mobile Telecommunications System (UMTS), a third generation mobile communication system that has been widely used as a cellular technology, and Long Term Evolution (LTE), a fourth generation mobile communication system that is currently in widespread use, are constructed as systems that allow communication with terrestrial user equipment (UE), that is, wireless communication terminals moving on the ground.

Furthermore, unmanned aerial vehicles (UAVs) typified by drones that are expected to be utilized in the fields of agriculture and logistics and in times of disaster are attracting attention. In response to the growing popularity of UAVs, the Third Generation Partnership Project (3GPP) has also launched the study item (SI) "Enhanced LTE Support for Aerial Vehicles" in Rel-15 with the aim of providing a communication environment to UAVs. Cellular networks have been originally constructed with wireless communication devices moving on the ground in mind. Thus, the extension of mobility management due to a coverage environment different from that on the ground and the like have been discussed. This SI has been completed at 3GPP RAN #78 held in December 2017. At this meeting, the proposal of the work item (WI) "Enhanced LTE Support for Aerial Vehicles" has been approved.

Non-Patent Document 1 points out that the result is obtained that aerial UE moving in the air observes more surrounding cells than terrestrial UE on the ground. That is, aerial UE in a line-of-sight (LOS) environment sees cells located far away, compared with terrestrial UE. Thus, by maintaining connection with a cell located as far as possible in mobility management for aerial UE, an operation that allows a reduction in frequency of handover of the aerial UE is made possible. However, it is feared that as a side effect, a signal transmitted from the aerial UE may interfere with many base stations, affecting communication with terrestrial UE.

Furthermore, aerial UE is expected to be in a communication state, that is, in connected mode so that some control can be performed at all times for its flight control. However, in a case where a Radio Link Failure (RLF) occurs, UE normally initiates the connection re-establishment procedure if security is valid, or switches to the idle mode if security is not valid. That is, support for the idle mode is necessary also for aerial UE.

Note that the network side manages the location of UE in idle mode only in the Tracking Area (TA) unit. This is because paging for calling UE in idle mode is performed in the TA unit, and thus it is sufficient to manage the mobility within the TA range. By widening the TA range, the frequency of TA updates performed every time the TA is changed due to the movement of UE can be reduced to reduce the power consumption during standby. On the other hand, if the TA range is widened, it is necessary to perform paging from all base stations belonging to the same TA in order to call one UE, resulting in consumption of more radio resources. That is, the size of the TA is set in a trade-off relationship between power consumption during standby and the overhead of radio resources required for paging. Thus, the network side cannot know the exact location of UE in idle mode. Therefore, it is difficult to take measures such as directing antenna directivity on the base station side toward aerial UE to reduce the transmission output of the aerial UE with the aim of reducing interference to surrounding cells caused by a signal transmitted from the aerial UE, for example.

Further, Non-Patent Document 2 points out that aerial UE has handover characteristics different from those of terrestrial UE. Further, Non-Patent Document 2 proposes a TA list for aerial UE since aerial UE observes a larger number of surrounding cells than terrestrial UE. Here, the TA update procedure for aerial UE needs to be optimized according to the characteristics of aerial UE different from those of terrestrial UE.

Then, in view of the above-described points, the present discloser has conducted earnest studies on a technology by which a TA update procedure for aerial UE can be optimized according to the characteristics of the aerial UE to reduce the power consumption of the aerial UE and to prevent the aerial UE from affecting communication. As a result, as described below, the present discloser has come to devise a technology by which a TA update procedure for aerial UE can be optimized according to the characteristics of the aerial UE to reduce the power consumption of the aerial UE and to prevent the aerial UE from affecting communication.

The background of the embodiment of the present disclosure has been described above. Next, the embodiment of the present disclosure will be described in detail.

[1.2. Configuration Example and Operation Example]

FIG. 1 is an explanatory diagram showing a configuration example of a communication system according to the embodiment of the present disclosure. As shown in FIG. 1, the communication system according to the embodiment of the present disclosure includes a terminal device 100 that is aerial UE, and base stations 200*a* and 200*b* that perform wireless communication with the terminal device 100.

For communication between the base station 200*a* and the terminal device 100 in a communication state, that is, in connected mode, a communication method of allowing connection to a cell located as close as possible is considered in order to reduce interference to surrounding cells. The base station 200*a* acquires information related to the location of the terminal device 100 in connected mode, and performs beamforming toward the terminal device 100 using, for example, a Full-Dimension MIMO (FD-MIMO) technology. In FIG. 1, the base station 200*a* performs communication using a beam b1 beamformed toward the terminal device 100. This connection method allows the terminal device 100 to control the transmission output to an output at which it can communicate only with the neighboring base station 200*a* that performs beamforming for reception (that is, to perform power control) to reduce the risk of interfering with surrounding base stations (for example, the base station 200*b*).

As is the case with terrestrial UE, the base station 200*a* transmits a control signal and data to the terminal device 100 that is aerial UE by orthogonal frequency division multiple access (OFDMA). The terminal device 100 transmits a control signal and data to the base station 200*a* by single-carrier frequency division multiple access (SC-FDMA).

The terminal device 100 may perform Device to Device (D2D) communication, which is also called Sidelink, with another aerial UE, and may use, for example, an air interface called PC5 in LTE. Note that as methods of allocating a radio resource used in D2D communication or a resource pool to a terminal device, defined are a method called Mode 1 in which a base station gives an instruction to a terminal device, and a method called Mode 2 in which a terminal device selects a resource pool from a set of resource pools allocated in advance, or a radio resource used for D2D communication. In a case where a terminal device is located in cellular coverage when performing D2D communication, resource pool allocation is performed by the Mode 1 method. That is, in a case where aerial UE in idle mode starts D2D communication in cellular coverage, it performs the RRC connection establishment procedure involving random access for a resource pool allocation request, and switches to the connected mode.

As is the case with aircrafts, a legal restriction that imposes communication with a so-called control tower may be applied to aerial UE. It is expected that in many cases, aerial UE will be in a communication state, for example, in a state such as the connected mode. However, the coverage of cellular systems is currently optimized for terrestrial UE. In the example of FIG. 1, reference numeral c1 represents the terrestrial UE coverage of the base station 200*a*, and reference numeral c2 represents the terrestrial UE coverage of the base station 200*b*. Therefore, it is feared that there are many coverage holes in coverage in the sky where aerial UE moves. Thus, it is feared that aerial UE may frequently encounter Radio Link Failure (RLF), compared with terrestrial UE. If aerial UE cannot recover the communication state in a certain period of time, it switches to the idle mode. Therefore, it is also considered necessary to optimize a procedure in idle mode for aerial UE. Furthermore, aerial UE may use extended discontinuous reception (DRX/eDRX) in connected mode or in idle mode in order to reduce power consumption. This DRX/eDRX includes a period during which intermittent transmission and reception or intermittent reception is performed, and a period during which no reception is performed, a so-called sleep state. By setting this sleep longer, aerial UE can reduce power consumption. Moreover, in the next generation communication system, so-called 5G, operation not only in connected mode but also in inactive mode may be allowed. Furthermore, in inactive mode, a paging area may be managed in a RAN Notification Area instead of a TA. Here, the idle mode may be the RRC idle mode, the connected mode may be the RRC connected mode, and the inactive mode may be the RRC inactive mode.

For aerial UE in idle mode, the network side manages the location of the UE in idle mode only in the Tracking Area (TA) unit as described above. Therefore, if a TA acquired through system information is different from a TA in which aerial UE has been located so far, the aerial UE must perform a TA update to notify the network side that it is located in the new TA. However, LTE uses a system called Multi TA Registration for the purpose of dispersing TA updates performed simultaneously by many terminal devices moving simultaneously at high speed, for example, when moving by train, by which a TA-List including a plurality of TAs can be allocated to each terminal device. Then, if a TA is changed within the same TA-List, a TA update is not performed. Thus, in a case where a TA-List is allocated, aerial UE performs a TA update if a TA is changed beyond the TA-List. Furthermore, aerial UE in inactive mode may perform an RAN notification area update if an RAN notification area in which it is located is changed.

Figure 2:
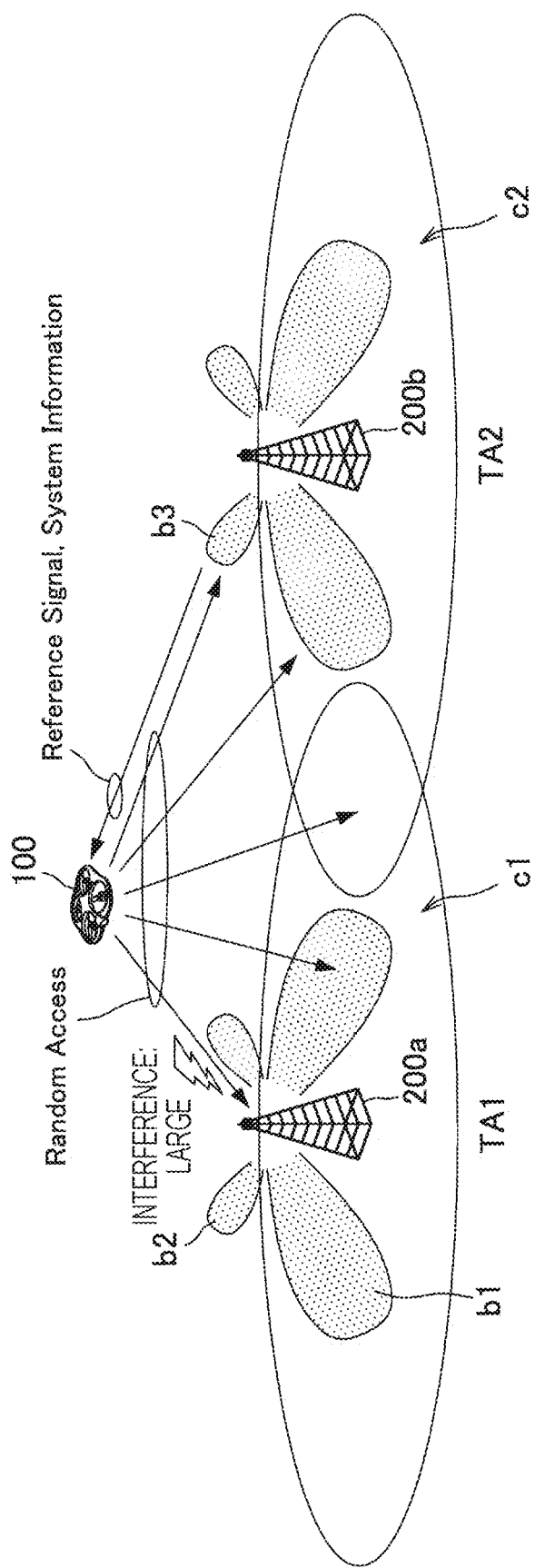
FIG. 2 is an explanatory diagram showing a state in which aerial UE is receiving a signal from a side lobe of a base station.

It is considered that aerial UE cannot always receive a signal transmitted from a base station via a main lobe. FIG. 2 is an explanatory diagram showing a state in which the terminal device 100 that is aerial UE receives a signal from a side lobe b2 of the base station 200*b*. As shown in FIG. 2, there may be a case where the terminal device 100 receives a signal via the side lobe b3 of the base station 200b rather than a main lobe b1 or a side lobe b2 of the base station 200a, depending on the location where it is floating.

In this case, although the terminal device 100 is located near the base station 200a belonging to a TA1, it determines that a signal transmitted via the side lobe b2 from the base station 200b belonging to a TA2 is a signal in the best reception status rather than that from the base station 200a belonging to the TA1 (cell selection/reselection). Then, the terminal device 100 erroneously determines that the base station 200b is a serving cell.

Moreover, in the example shown in FIG. 2, since the terminal device 100 determines that it is newly located in the TA2, it starts a random access procedure for performing a TA update toward the base station 200b, not the neighboring base station 200a. A transmission signal associated with the random access to the base station 200b that is not a neighboring base station can be an interference signal to the base station 200a that is a neighboring base station. Therefore, for the terminal device 100 that is aerial UE, a system to trigger a TA update in a manner different from that for terrestrial UE is desired. Here, a TA-List or a TA is the paging area unit, and thus can be regarded as a paging area.

Figure 3:
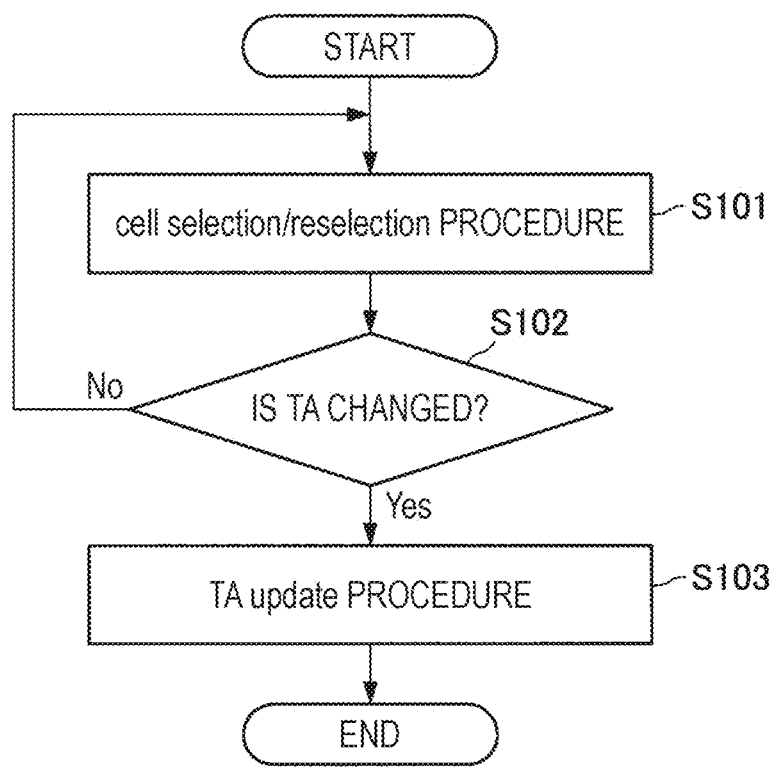
FIG. 3 is a flowchart showing an example of a TA update procedure for terrestrial UE.

FIG. 3 is a flowchart showing an example of a TA update procedure for terrestrial UE. A cell to camp on is selected by cell selection/reselection in idle mode (step S101). A TA-List or a TA to which the selected cell belongs is checked through system information of the cell, and is compared with a TA-List or a TA to which the terrestrial UE has belonged so far (step S102). If it is different, a TA update is performed (step S103). On the other hand, if the cell belongs to the same TA-List or TA in step S102, the procedure in and after step S101 is repeated. Note that in the next-generation communication system, the procedure shown in FIG. 3 may be performed in inactive mode in addition to idle mode.

Figure 4:
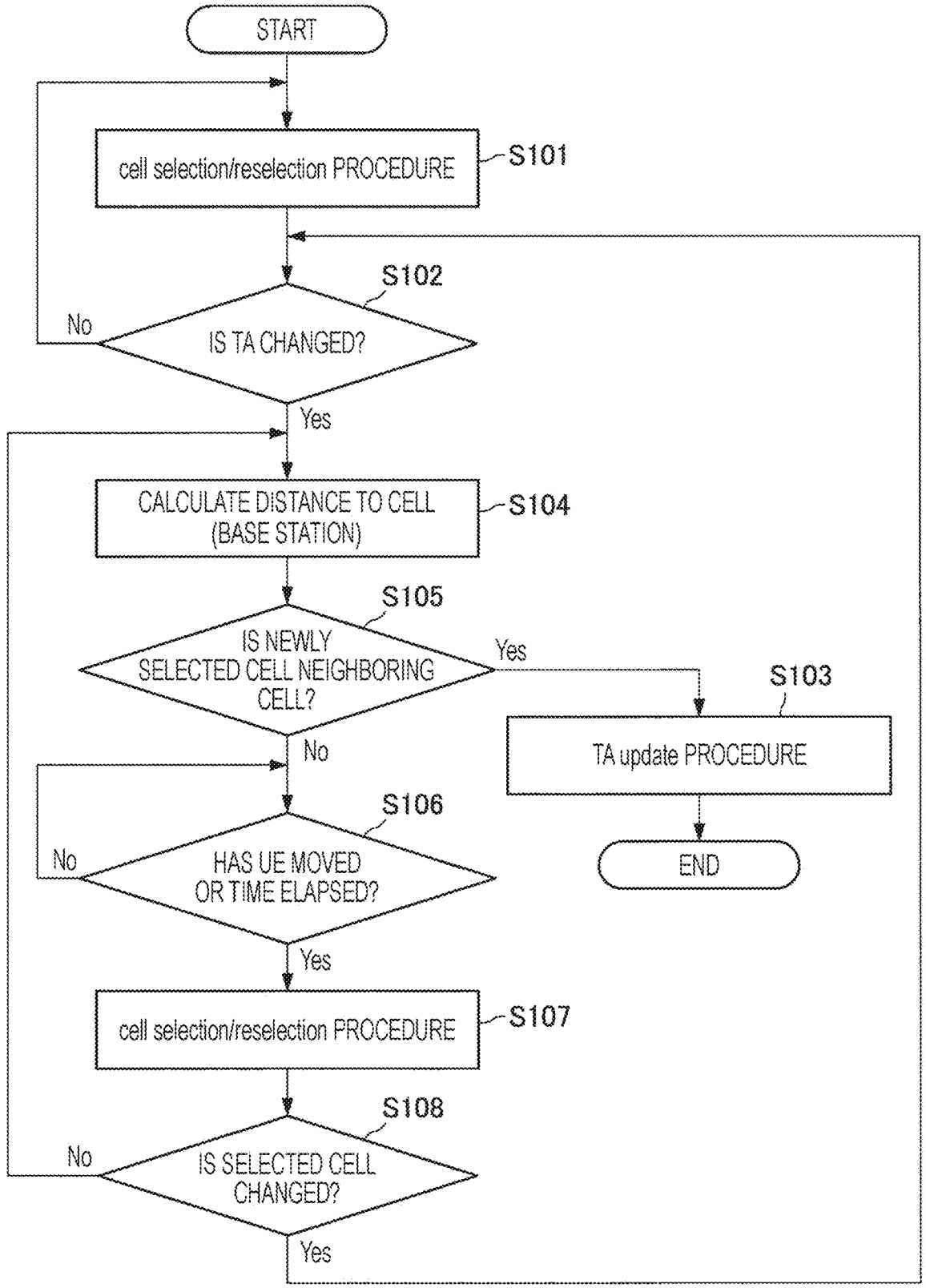
FIG. 4 is a diagram showing an example of a TA update procedure for a terminal device 100 according to the embodiment of the present disclosure.

FIG. 4 is a diagram showing an example of a TA update procedure for the terminal device 100 according to the embodiment of the present disclosure. FIG. 4 shows an example in a case where a condition for performing a TA update is that a candidate cell or base station selected by the cell selection/reselection procedure is a neighboring cell. Note that for the terminal device 100 that is aerial UE, steps S101 and S102 are the same as those of the TA update procedure for terrestrial UE, and thus redundant description will be omitted.

If the TA-List or the TA is different in step S102, the terminal device 100 calculates the distance to the cell (base station) (step S104). Next, the terminal device 100 determines whether or not the cell is a neighboring cell (step S105). If the terminal device 100 determines that the cell is a neighboring cell, it performs a TA update (step S103).

The terminal device 100 may calculate the distance to the cell (base station) using information related to the location of the device measured using, for example, a Global Navigation Satellite System (GNSS) or any other location information sensor, or a barometer, and information related to the location of the cell acquired through, for example, the system information.

The terminal device 100 may determine whether or not the cell is a neighboring cell by comparing the distances to surrounding cells with the distance to the cell. The terminal device 100 may determine whether or not the cell is a neighboring cell by comparison with a threshold related to the received strength of a reference signal acquired through the system information, for example.

The terminal device 100 may determine that the candidate cell or base station selected by the cell selection/reselection procedure is a neighboring cell by measuring Reference Signal Received Power (RSRP), which is the received strength of a reference signal transmitted from the candidate cell or base station, and comparing it with a threshold related to the received strength of the reference signal acquired through the system information.

The terminal device 100 may determine whether or not the cell is a neighboring cell by comparison with a threshold related to the distance acquired through the system information, for example.

The terminal device 100 may calculate the distance to the candidate cell or base station selected by the cell selection/reselection procedure on the basis of information related to the reference signal acquired through the system information (for example, information related to the transmission power of the reference signal), and RSRP, which is the received strength of the reference signal transmitted from the candidate cell or base station. That is, the terminal device 100 may calculate a path loss on the candidate cell or base station. Note that the system information may include information related to a reference signal transmitted from a surrounding cell or a surrounding base station (for example, information related to the transmission power of the reference signal). Moreover, the information related to the reference signal may be associated with identification information of the cell or base station from which it is transmitted.

Furthermore, the terminal device 100 may acquire information related to an offset based on the antenna directivity through the system information, to make a correction when measuring the received strength of the reference signal transmitted from the candidate cell or base station, or calculating the distance to the candidate cell or base station. This is because the terminal device 100 that is aerial UE cannot always transmit and receive signals via a main lobe in coverage optimized for terrestrial UE. Specifically, the terminal device 100 may make a correction for the amount of deterioration in the case of reception via a side lobe, for example, in antenna directivity optimized for terrestrial UE. Note that the information related to an offset may be provided in the form of setting a value for the terminal device 100 that is aerial UE different from that for terrestrial UE in Qrxlevminoffset or Pcompensation used for the calculation of the S-criterion that is defined as a cell selection criterion for conventional terrestrial UE. Moreover, an index for correction for aerial UE may be defined, and a plurality of different values may be set according to the altitude of the terminal device 100. Furthermore, Qrxlevminoffset or Pcompensation for the terminal device 100 that is aerial UE, or the index for correction defined for aerial UE may be variable depending on information related to the location including the altitude. That is, on the basis of Qrxlev for the terminal device 100 that is aerial UE, it can be determined that the selected cell or base station is a neighboring cell or base station. Note that the system information may include information related to an offset based on the antenna directivity of a surrounding cell or a surrounding base station. Moreover, the information related to the offset based on the antenna directivity may be associated with identification information of a target cell or base station.

On the other hand, if it is determined in step S105 that the selected cell is not a neighboring cell, the terminal device 100 monitors whether it has moved or a set time has elapsed. After the terminal device 100 determines that it has moved or the set time has elapsed (step S106), it performs the cell selection/reselection procedure (step S107).

Next, the terminal device 100 determines whether or not the selected cell is changed (step S108). If the selected cell is changed, the terminal device 100 returns to step S102 (step S109). On the other hand, if the selected cell is not changed, the terminal device 100 repeats the procedure in and after step S104. Then, if it is determined in step S105 that the selected cell is a neighboring cell, the terminal device 100 performs a TA update (step S103). Note that in the next-generation communication system, the procedure shown in FIG. 4 may be performed in inactive mode in addition to idle mode.

Figure 5:
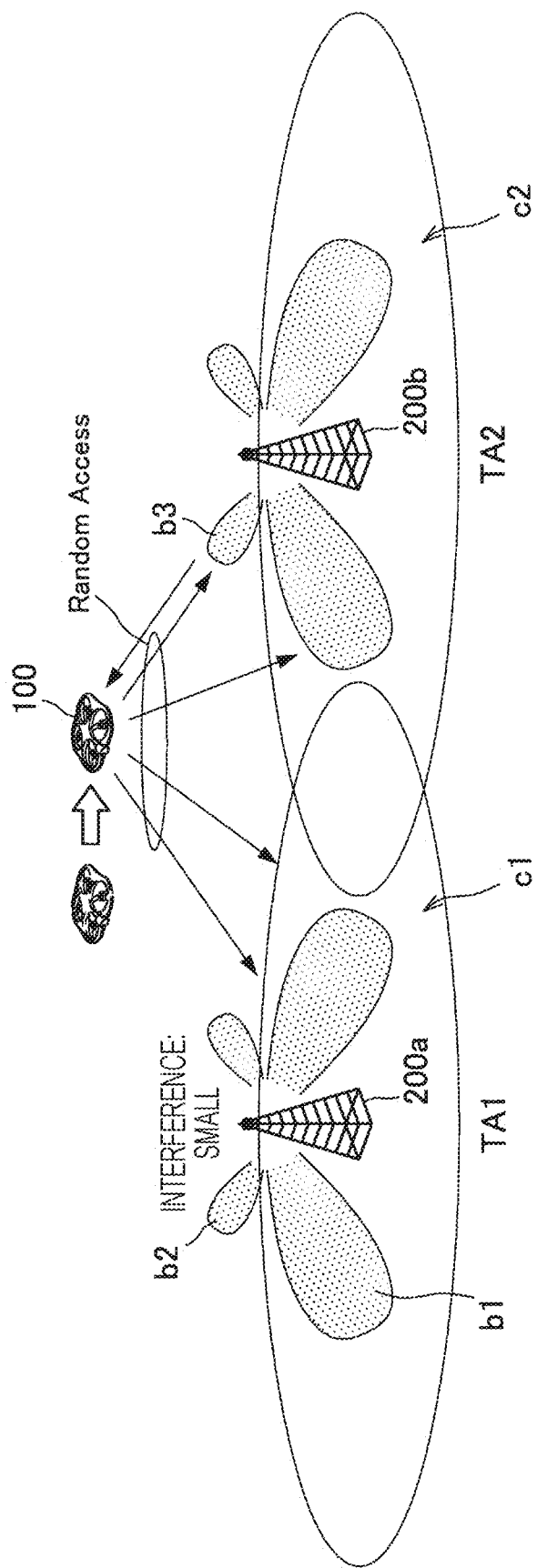
FIG. 5 is a diagram showing an example in which the terminal device performs a random access procedure toward a neighboring cell when performing a TA update.

FIG. 5 is a diagram showing an example in which the terminal device 100 performs the random access procedure toward a neighboring cell when performing a TA update. Unlike in the example of FIG. 2, the terminal device 100 initiates the random access procedure for performing a TA update toward the base station 200b on condition that the base station 200b is a neighboring cell, so that transmission output for random access can be reduced. Consequently, the terminal device 100 can reduce interference to the base station 200a as compared with that in the example of FIG. 2.

Figure 6:
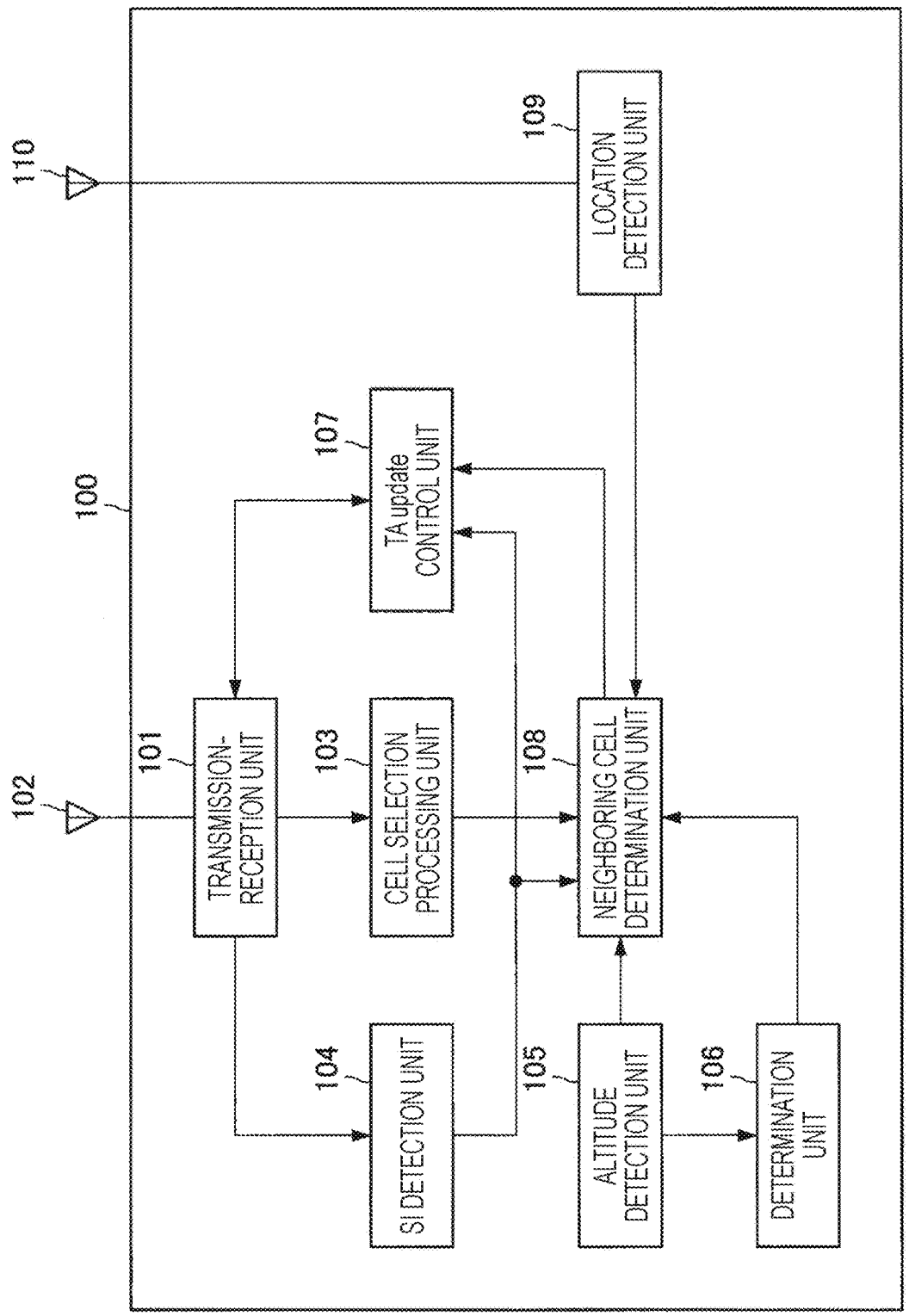
FIG. 6 is an example of a configuration of the terminal device according to the embodiment of the present disclosure.

FIG. 6 is an example of a configuration of the terminal device 100 according to the embodiment of the present disclosure. As shown in FIG. 6, the terminal device 100 according to the embodiment of the present disclosure includes a transmission-reception unit 101, a first antenna 102, a cell selection processing unit 103, a system information (SI) detection unit 104, an altitude detection unit 105, a determination unit 106, a TA update control unit 107, a neighboring cell determination unit 108, a location detection unit 109, and a second antenna 110.

Note that the terminal device 100 according to the embodiment of the present disclosure includes, in addition to the configuration shown in FIG. 6, a configuration for flight such as propellers, motors for rotating the propellers, and a control unit for driving the motors, for example, but these components are omitted in FIG. 6.

The terminal device 100 includes the transmission-reception unit 101, and receives signals from the base stations 200a and 200b or transmits signals to the base stations 200a and 200b via the first antenna 102. Here, the signals include a C-plane control signal, U-plane data, and further notification information such as system information, and others.

(Cell Selection Processing Unit 103)

The cell selection processing unit 103 receives reference signals transmitted from the base stations 200a and 200b, and selects a cell or a base station that provides the best reception environment from among a plurality of base stations including surrounding cells on the basis of RSRP that is the received strength of the reference signals.

(SI Detection Unit 104)

The SI detection unit 104 acquires system information via the transmission-reception unit 101. For example, a Tracking Area (TA) Code that is the identifier of a paging area is acquired via the System Information Block (SIB) 1.

(Altitude Detection Unit 105)

The altitude detection unit 105 detects the altitude of the terminal device 100. As the altitude detection unit 105, for example, a barometric pressure sensor can be used.

(Determination Unit 106)

The determination unit 106 determines whether the terminal device 100 is terrestrial UE or aerial UE on the basis of the altitude value detected by the altitude detection unit 105. The result of the determination by the determination unit 106 is sent to the neighboring cell determination unit 108. Note that in a case where the terminal device 100 has the UE Category, the UE Capability, or another judgement means (for example, contractor information), the terminal device 100 may judge that the terminal device 100 has a latent function to operate as aerial UE on the basis of the UE Category, the UE Capability, or the other determination means. Moreover, on the basis of the altitude value detected by the altitude detection unit 105, the determination unit 106 may judge whether the terminal device 100, which has been judged to have a latent function to operate as aerial UE, is operating as terrestrial UE or operating as aerial UE. Furthermore, the terminal device 100 may determine the type of System Information Block (SIB) to be acquired on the basis of the result of the determination unit 106. For example, a SIB x may be acquired in a case where the terminal device 100 is operating as terrestrial UE, and a SIB y may be acquired in a case where the terminal device 100 is operating as aerial UE. Note that the terminal device 100 operating as terrestrial UE or aerial UE may acquire two or more types of SIBs.

(TA Update Control Unit 107)

The TA update control unit 107 controls the TA update procedure in the terminal device 100. When the determination unit 106 determines that the terminal device 100 is terrestrial UE, the TA update control unit 107 determines whether or not a TA Code detected through the SIB 1 is different from a TA Code when a TA update was performed last time. In a case where a TA Code detected through the SIB 1 is different from a TA Code when a TA update was performed last time, and further, if a TA-List is allocated, the TA Code is included in a TA-List different from a TA-List when the TA update was performed last time, a TA update is performed via the transmission-reception unit 101.

(Neighboring Cell Determination Unit 108)

The neighboring cell determination unit 108 determines a neighboring cell of the terminal device 100. When the determination unit 106 determines that the terminal device 100 is aerial UE, the neighboring cell determination unit 108 further determines whether a cell or base station selected by the cell selection processing unit 103 is a neighboring cell or base station. In a case where the neighboring cell determination unit 108 determines that a cell or base station selected by the cell selection processing unit 103 is a neighboring cell or base station, and a TA Code detected through the SIB 1 is different from a TA Code when a TA update was performed last time, and further, if a TA-List is allocated, the TA Code is included in a TA-List different from a TA-List when the TA update was performed last time, the TA update control unit 107 performs a TA update via the transmission-reception unit 101.

(Location Detection Unit 109)

The location detection unit 109 detects information related to the location of the terminal device 100. The neighboring cell determination unit 108 may determine a neighboring cell using the information related to the location of the terminal device 100 detected by the location detection unit 109. Here, the location detection unit 109 may be a device provided, for example, for Global Navigation Satellite System (GNSS), and may receive a GNSS signal via the second antenna 110 and calculate the latitude, longitude, and altitude. Note that a typical example of GNSS is the Global Positioning System (GPS) that is operated by the United States of America and is widely used as a satellite positioning system, but is not limited to this.

In the configuration of the terminal device 100 described above, the cell selection processing unit 103, the SI detection unit 104, the determination unit 106, the TA update control unit 107, and the neighboring cell determination unit 108 may be configured as a processor.

The terminal device 100 according to the embodiment of the present disclosure has the configuration as shown in FIG. 6 so as to be able to control the transmission output to an output at which it can communicate only with a neighboring base station, and to reduce the risk of interference to surrounding base stations. Moreover, in a case where a base station applies unique beamforming to at least one of PRACH resource configurations allocated to random access, the terminal device 100 uses a PRACH resource to which beamforming is applied at the time of random access. By using a PRACH resource to which beamforming is applied, the terminal device 100 can control the transmission output to an output at which it can communicate only with a neighboring base station via the beamforming to further reduce the risk of interference to surrounding base stations. Here, beamforming may have directivity tilted upward for aerial UE. The tilt angle may be changed according to the types of PRACH resource configurations. That is, the terminal device 100 may select the type of PRACH resource to which beamforming is applied at the time of random access, according to the flying altitude.

Figure 7:
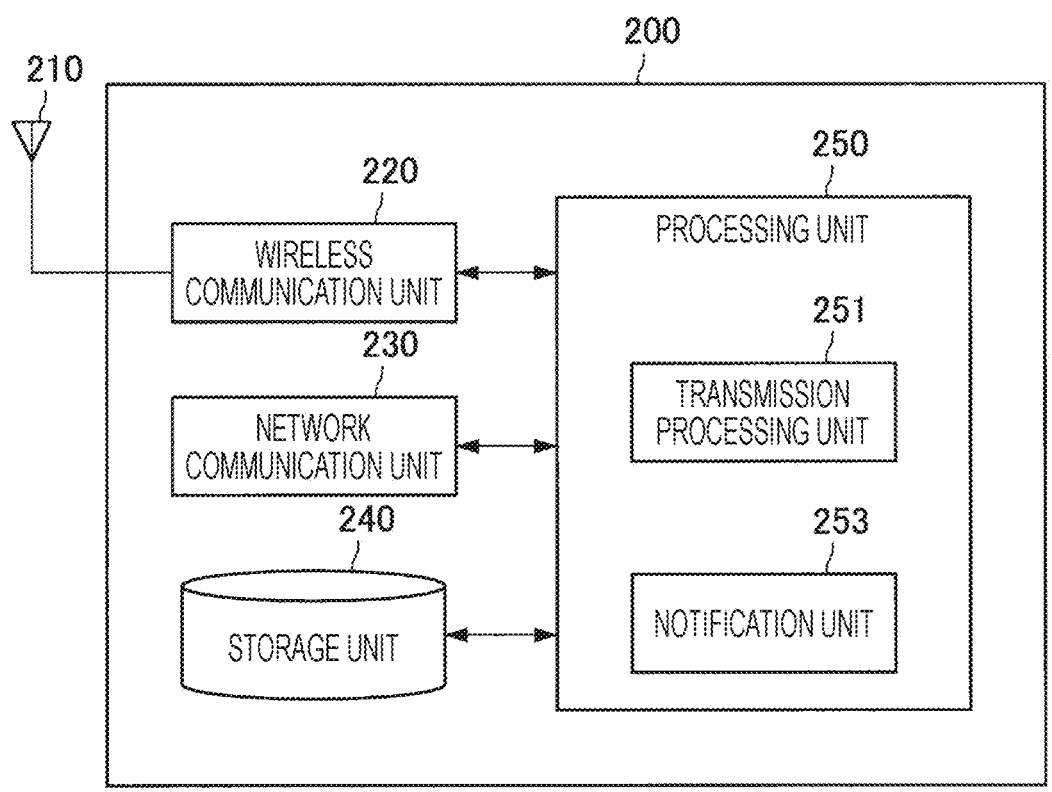
FIG. 7 is an explanatory diagram showing a configuration example of a base station according to the embodiment of the present disclosure.

Next, a configuration example of a base station according to the embodiment of the present disclosure will be described. FIG. 7 is an explanatory diagram showing a configuration example of a base station according to the embodiment of the present disclosure. As illustrated in FIG. 7, the base station 200 according to the embodiment of the present disclosure includes an antenna unit 210, a wireless communication unit 220, a network communication unit 230, a storage unit 240, and a processing unit 250.

(Antenna Unit 210)

The antenna unit 210 radiates a signal output by the wireless communication unit 220 as radio waves into space. Furthermore, the antenna unit 210 converts radio waves in space into a signal and outputs the signal to the wireless communication unit 220.

(Wireless Communication Unit 220)

The wireless communication unit 220 transmits and receives signals. For example, the wireless communication unit 220 transmits a downlink signal to the UE 100 and receives an uplink signal from the UE 100.

(Network Communication Unit 230)

The network communication unit 230 transmits and receives information. For example, the network communication unit 230 transmits information to other nodes and receives information from other nodes. For example, the other nodes include a core network and other base stations.

(Storage Unit 240)

The storage unit 240 temporarily or permanently stores programs and data for the operation of the base station 200.

(Processing Unit 250)

The processing unit 250 provides various functions of the base station 200. The processing unit 250 includes a transmission processing unit 251 and a control unit 253. Note that the processing unit 250 may further include components other than these components. That is, the processing unit 250 may perform operations other than the operations of these components.

(Transmission Processing Unit 251)

The transmission processing unit 251 executes processing related to data transmission from the base station 200.

(Control Unit 253)

The control unit 253 executes various types of processing of the base station 200. Specifically, beamforming control is performed on the antenna unit 210.

Figure 8:
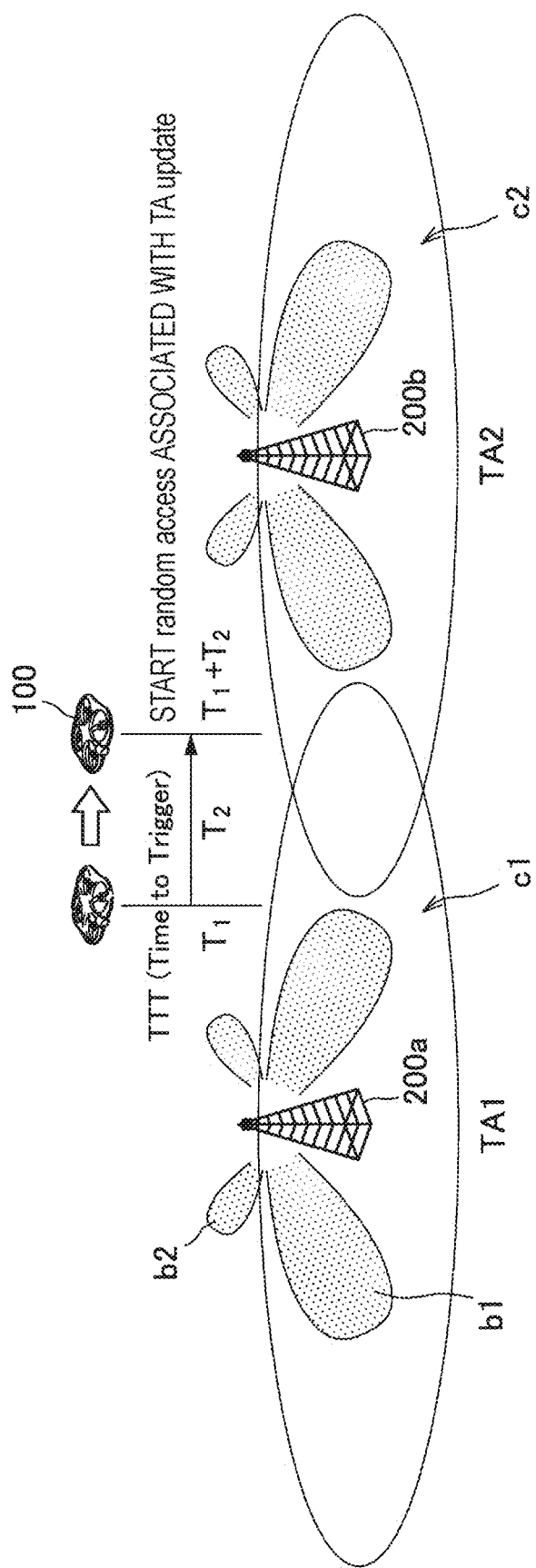
FIG. 8 is a diagram showing an example in which the terminal device performs the random access procedure toward a neighboring cell when performing a TA update.

A condition for the terminal device 100 to perform a TA update is not limited to the example shown in FIG. 4. FIG. 8 is a diagram showing another example in which the terminal device 100 performs the random access procedure toward a neighboring cell when performing a TA update. As shown in FIG. 8, a TA update may be performed at a point of time when a period of time T2 has elapsed from a time T1 when a different TA-List or TA is detected until the TA update is performed. That is, a so-called time to trigger (TTT) may be used. For the TTT, different values may be set for different base stations, or different values may be set according to the speed or altitude of the terminal device 100. Since aerial UE is moving in many cases, by controlling the timing to perform a TA update on the basis of the TTT according to the speed or altitude, it is possible to reduce the risk of interference caused by random access transmission associated with the TA update of the terminal device 100.

Figure 9:
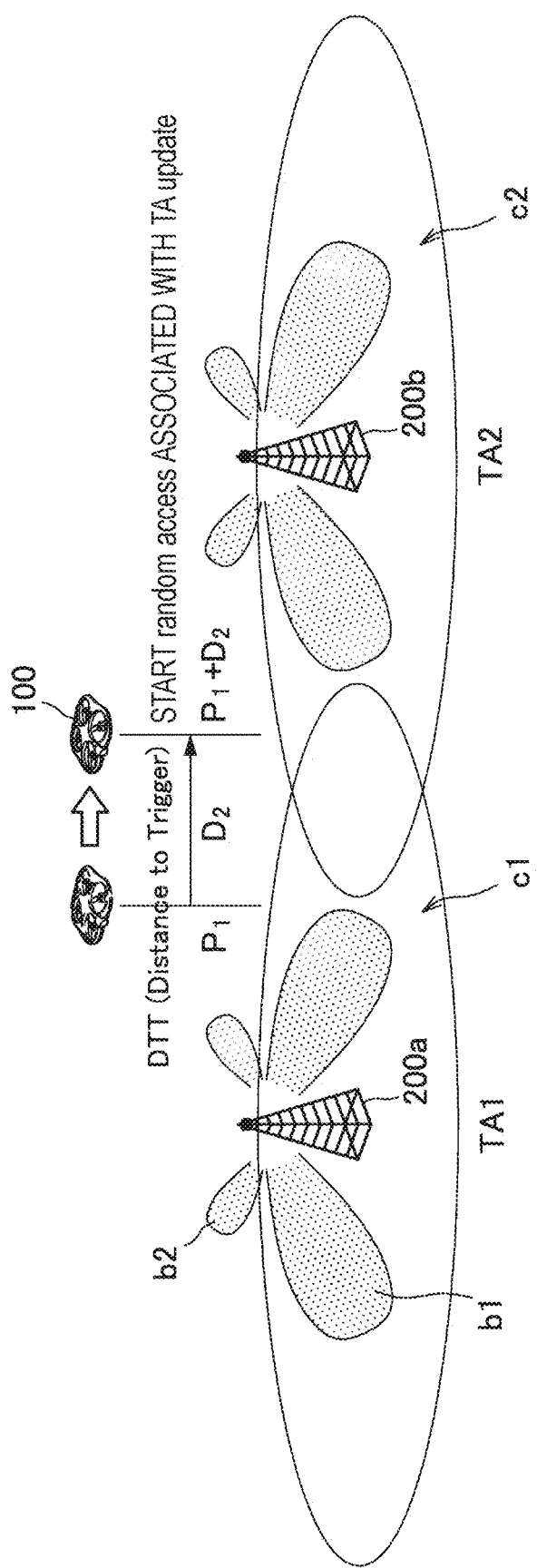
FIG. 9 is a diagram showing an example in which the terminal device performs the random access procedure toward a neighboring cell when performing a TA update.

FIG. 9 is a diagram showing another example in which the terminal device 100 performs the random access procedure toward a neighboring cell when performing a TA update. For example, as shown in FIG. 9, the terminal device 100 may implement a condition for performing a TA update at a point of time when a distance D2 has been traveled from a position P1 where a different TA-List or TA is detected until the TA update is performed. That is, a distance to trigger (DTT) may be used. For the D2 value, different values may be set according the speed or altitude of the terminal device 100. Aerial UE is moving in many cases and can also detect its location on its own. Thus, by controlling a point at which a TA update is performed on the basis of the DTT according to the speed or the altitude, the risk of interference of the terminal device 100 due to random access transmission associated with the TA update can be reduced.

The distance D2 may be a distance only in the horizontal direction or may be a distance that takes the height direction into account.

Furthermore, an additional condition for the terminal device 100 to perform a TA update may be a case where a cell operating in a specific frequency range is selected. For example, the terminal device 100 operating as aerial UE may acquire information related to the specific frequency range through system information. If a selected cell or base station is a cell or base station operating in a frequency band included in the specific frequency range, and a TA to which the selected cell or base station belongs is changed, a TA update may be performed. Furthermore, the terminal device 100 operating as aerial UE may acquire an SIB including an inter-frequency carrier frequency list different from that for terrestrial UE. Furthermore, the terminal device 100 operating as aerial UE may acquire a SIB including parameters for cell reselection different from those for terrestrial UE, or an SIB including an intra-frequency neighbor cell list. That is, a condition for performing a TA update may be a case where an SIB including an inter-frequency carrier frequency list different from that for terrestrial UE, and further an SIB including parameters for cell reselection different from those for terrestrial UE, or an SIB including an intra-frequency neighbor cell list is acquired, and a TA to which a cell or base station selected on the basis of one or more SIBs of these SIBs belongs is changed.

Note that the random access method in performing a TA update in the present embodiment may be applied to random access that aerial UE in idle mode performs to request resource pool allocation when starting D2D communication in cellular coverage. That is, the neighboring cell determination unit 108 may determine whether or not to initiate D2D communication in cellular coverage.

2. APPLICATION EXAMPLES

The technology according to the present disclosure can be applied to various products. For example, the base stations 200a and 200b may be implemented as evolved Node Bs (eNBs) of any type such as macro eNBs or small eNBs. A small eNB may be an eNB that covers a cell smaller than a macro cell, such as a pico eNB, a micro eNB, or a home (femto) eNB. Alternatively, the base stations 200a and 200b may be implemented as another type of base stations such as Node Bs or base transceiver stations (BTSs). The base stations 200a and 200b may include a main body that controls wireless communication (also referred to as a base station device), and one or more remote radio heads (RRHs) disposed at locations different from that of the main body. Furthermore, various types of terminals described later may temporarily or semipermanently execute base station functions to operate as the base stations 200a and 200b.

First Application Example

Figure 10:
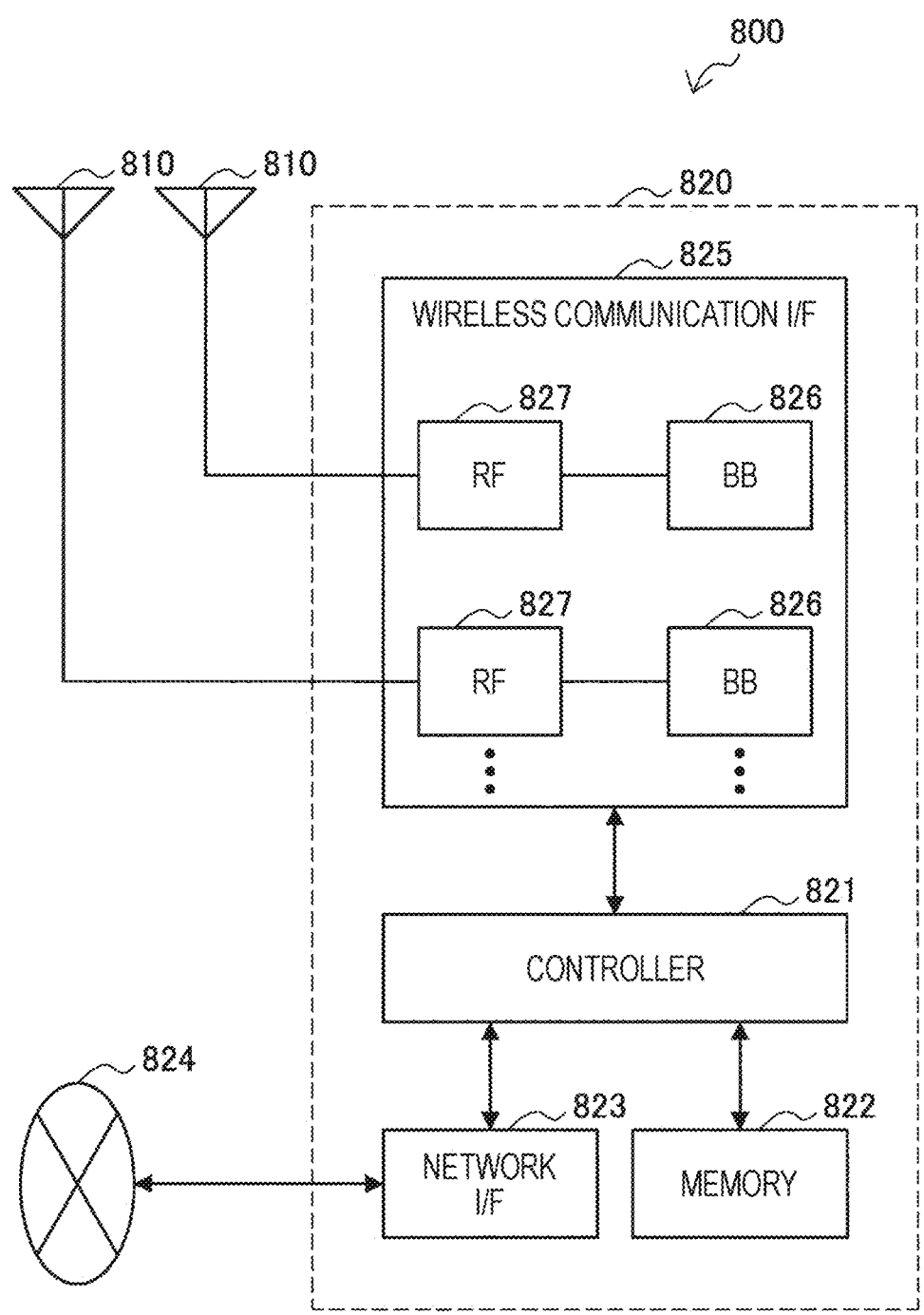
FIG. 10 is a block diagram showing a first example of a schematic configuration of an eNB to which a technology according to the present disclosure can be applied.

FIG. 10 is a block diagram illustrating a first example of a schematic configuration of an eNB to which the technology according to the present disclosure can be applied. An eNB 800 has one or more antennas 810 and a base station device 820. Each antenna 810 and the base station device 820 can be connected to each other via an RF cable.

Each of the antennas 810 has a single or a plurality of antenna elements (for example, a plurality of antenna elements constituting a MIMO antenna), and is used for the transmission and reception of radio signals by the base station device 820. The eNB 800 may have a plurality of antennas 810 as shown in FIG. 10. The plurality of antennas 810 may correspond one-to-one to a plurality of frequency bands used by the eNB 800, for example. Note that although FIG. 10 shows an example in which the eNB 800 has the plurality of antennas 810, the eNB 800 may have a single antenna 810.

The base station device 820 includes a controller 821, a memory 822, a network interface 823, and a wireless communication interface 825.

The controller 821 may be, for example, a CPU or a DSP, and operates various functions in upper layers of the base station device 820. For example, the controller 821 generates a data packet from data in a signal processed by the wireless communication interface 825, and transfers the generated packet via the network interface 823. The controller 821 may generate a bundled packet by bundling data from a plurality of baseband processors, and transfer the generated bundled packet. Furthermore, the controller 821 may have logical functions to perform control such as radio resource control, radio bearer control, mobility management, admission control, or scheduling. Moreover, the control may be performed in cooperation with surrounding eNBs or core network nodes. The memory 822 includes RAM and ROM, and stores programs executed by the controller 821 and various control data (such as a terminal list, transmission power data, and scheduling data, for example).

The network interface 823 is a communication interface for connecting the base station device 820 to a core network 824. The controller 821 may communicate with core network nodes or other eNBs via the network interface 823. In that case, the eNB 800 and core network nodes or other eNBs may be connected to each other by a logical interface (for example, the S1 interface or the X2 interface). The network interface 823 may be a wired communication interface, or may be a wireless communication interface for wireless backhaul. In a case where the network interface 823 is a wireless communication interface, the network interface 823 may use a frequency band higher than a frequency band used by the wireless communication interface 825, for wireless communication.

The wireless communication interface 825 supports a cellular communication scheme such as Long Term Evolution (LTE) or LTE-Advanced, and provides wireless connection to terminals located in the cell of the eNB 800 via the antennas 810. The wireless communication interface 825 may typically include a baseband (BB) processor 826 and an RF circuit 827, or the like. The BB processor 826 may perform, for example, encoding/decoding, modulation/demodulation, multiplexing/demultiplexing, and the like, and performs various types of signal processing in different layers (for example, L1, Medium Access Control (MAC), Radio Link Control (RLC), and Packet Data Convergence Protocol (PDCP)). The BB processor 826 may have some or all of the logical functions described above instead of the controller 821. The BB processor 826 may be a module that includes a memory storing a communication control program, a processor executing the program, and a related circuit. The functions of the BB processor 826 may be changeable by updating the program. Furthermore, the module may be a card or a blade inserted into a slot of the base station device 820, or may be a chip mounted on the card or the blade. On the other hand, the RF circuit 827 may include a mixer, a filter, and an amplifier, or the like, and transmits and receives radio signals via the antenna 810.

The wireless communication interface 825 may include a plurality of BB processors 826 as shown in FIG. 10. The plurality of BB processors 826 may correspond one-to-one to a plurality of frequency bands used by the eNB 800, for example. Furthermore, the wireless communication interface 825 may include a plurality of RF circuits 827 as shown in FIG. 10. The plurality of RF circuits 827 may correspond one-to-one to the plurality of antenna elements, for example. Note that although FIG. 10 shows an example in which the wireless communication interface 825 includes the plurality of BB processors 826 and the plurality of RF circuits 827, the wireless communication interface 825 may include a single BB processor 826 or a single RF circuit 827.

In the eNB 800 shown in FIG. 11, the wireless communication unit 220 described with reference to FIG. 7 may be implemented in the wireless communication interface 825 (for example, the BB processors 826 and/or the RF circuits 827), the controller 821, and/or the network interface 823. For example, the wireless communication interface 825, the controller 821, and/or the network interface 823 transmits first control information and second control information, and receives a control information request and transmits corresponding third control information. For example, functions for performing these operations may be implemented in a processor included in the wireless communication interface 825. As a device that performs these operations, the eNB 800, the base station device 820, or the above-described module may be provided, or a program for causing the processor to perform the above-described operations may be provided. Furthermore, a readable recording medium recording the program may be provided. Moreover, the antenna unit 210 may be implemented in the antennas 810.

Second Application Example

Figure 11:
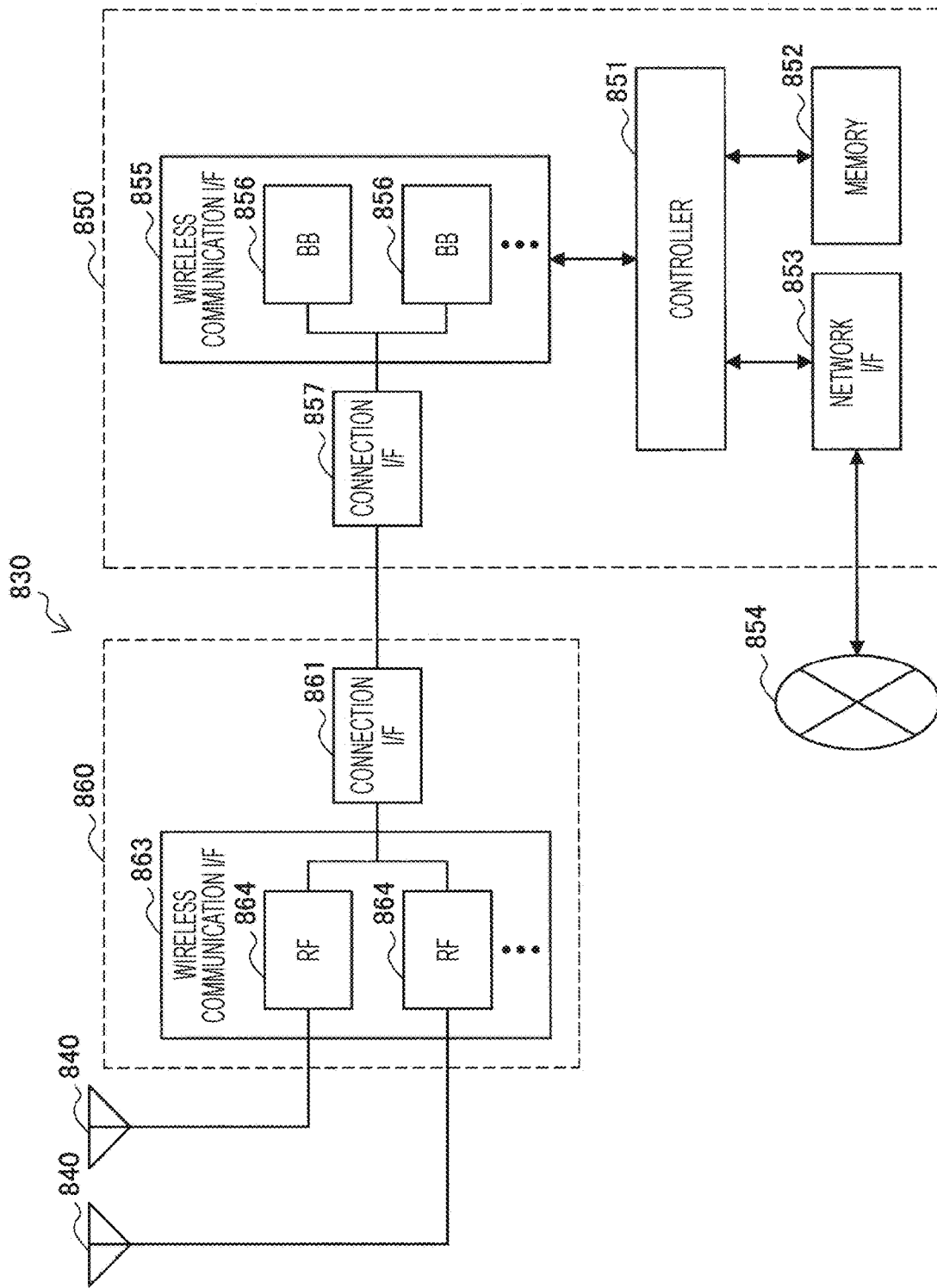
FIG. 11 is a block diagram showing a second example of a schematic configuration of an eNB to which a technology according to the present disclosure can be applied.

FIG. 11 is a block diagram showing a second example of a schematic configuration of an eNB to which the technology according to the present disclosure can be applied. An eNB 830 includes one or more antennas 840, a base station device 850, and an RRH 860. Each antenna 840 and the RRH 860 can be connected to each other via an RF cable. Furthermore, the base station device 850 and the RRH 860 can be connected to each other by a high-speed line such as an optical fiber cable.

Each of the antennas 840 has a single or a plurality of antenna elements (for example, a plurality of antenna elements constituting a MIMO antenna), and is used for the transmission and reception of radio signals by the RRH 860. The eNB 830 may have a plurality of antennas 840 as shown in FIG. 27. The plurality of antennas 840 may correspond one-to-one to a plurality of frequency bands used by the eNB 830, for example. Note that although FIG. 11 shows an example in which the eNB 830 has the plurality of antennas 840, the eNB 830 may have a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 11.

The wireless communication interface 855 supports a cellular communication scheme such as LTE or LTE-Advanced, and provides wireless connection to terminals located in a sector corresponding to the RRH 860 via the RRH 860 and the antennas 840. The wireless communication interface 855 may typically include a BB processor 856 or the like. The BB processor 856 is similar to the BB processor 826 described with reference to FIG. 11 except that it is connected to an RF circuit 864 in the RRH 860 via the connection interface 857. The wireless communication interface 855 may include a plurality of BB processors 856 as shown in FIG. 11. The plurality of BB processors 856 may correspond one-to-one to a plurality of frequency bands used by the eNB 830, for example. Note that although FIG. 11 shows an example in which the wireless communication interface 855 includes the plurality of BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the high-speed line connecting the base station device 850 (wireless communication interface 855) and the RRH 860.

Furthermore, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high-speed line.

The wireless communication interface 863 transmits and receives radio signals via the antennas 840. The wireless communication interface 863 may typically include an RF circuit 864 or the like. The RF circuit 864 may include a mixer, a filter, and an amplifier, or the like, and transmits and receives radio signals via the antenna 840. The wireless communication interface 863 may include a plurality of RF circuits 864 as shown in FIG. 11. The plurality of RF circuits 864 may correspond one-to-one to the plurality of antenna elements, for example. Note that although FIG. 11 shows an example in which the wireless communication interface 863 includes the plurality of RF circuits 864, the wireless communication interface 863 may include a single RF circuit 864.

In the eNB 830 shown in FIG. 12, the wireless communication unit 220 described with reference to FIG. 7 may be implemented in the wireless communication interface 855, the wireless communication interface 863 (for example, the BB processors 856 and/or the RF circuits 864), the controller 851, and/or the network interface 853. For example, the wireless communication interface 855, the wireless communication interface 863, the controller 851, and/or the network interface 853 transmits first control information and second control information, and receives a control information request and transmits corresponding third control information. For example, functions for performing these operations may be implemented in a processor included in the wireless communication interface 855 and/or the wireless communication interface 863. As a device that performs these operations, the eNB 830, the base station device 850, or the above-described module may be provided, or a program for causing the processor to perform the above-described operations may be provided. Furthermore, a readable recording medium recording the program may be provided. Moreover, the antenna unit 210 may be implemented in the antennas 840.

Note that those described as eNBs in the above description may be gNBs (gNodeBs or next Generation NodeBs).

3. SUMMARY

As described above, the embodiment of the present disclosure provides the terminal device 100 that is aerial UE, the terminal device 100 capable of reducing the power consumption of the aerial UE and preventing the aerial UE from affecting communication by optimizing the TA update procedure for the aerial UE in accordance with the characteristics of the aerial UE.

The steps in the procedure executed by each device in the present description do not necessarily need to be processed in time series in the order described as the sequence diagram or the flowchart. For example, the steps in the procedure executed by each device may be processed in an order different from the order described as the flowchart, or may be processed in parallel.

Furthermore, it is possible to create a computer program for causing hardware such as the CPU, the ROM, and the RAM built in each device to deliver functions equivalent to those of the above-described configuration of the device. Furthermore, a storage medium storing the computer program can also be provided. Moreover, by configuring the functional blocks shown in the functional block diagrams with hardware, a series of processing steps can be implemented by hardware.

Although the preferred embodiment of the present disclosure has been described in detail above with reference to the accompanying drawings, the technical scope of the present disclosure is not limited to the examples. It is obvious that a person having ordinary knowledge in the technical field of the present disclosure can arrive at various alterations or modifications within the scope of the technical idea described in the claims. These are, of course, considered to belong to the technical scope of the present disclosure.

Furthermore, the effects described in the present description are merely illustrative or exemplary and are not limiting. That is, in addition to the above effects or in place of the above effects, the technology according to the present disclosure can achieve other effects that are obvious to those skilled in the art from the description of the present description.

Note that the following configurations also belong to the technical scope of the present disclosure.

(1)

A wireless communication device including:

a determination unit that determines whether the device is a device moving on the ground or a device moving in the air;

a neighboring cell determination unit that determines whether or not identification information of a paging area acquired through common information transmitted from a base station is the same as identification information of a paging area for which an update was performed last time when the determination unit determines that the device is moving in the air; and a control unit that determines presence or absence of need for a paging area update on the basis of a condition for initiating a paging area update when the determination unit determines that the device is moving in the air.

(2)

The wireless communication device according to (1) above, in which the control unit determines presence or absence of need for a paging area update on the basis of whether or not the identification information of the paging area acquired through the common information is the same as identification information of a paging area for which an update was performed last time when the determination unit determines that the device is moving on the ground.

(3)

The wireless communication device according to (1) or (2) above, in which an index related to the condition for the device moving in the air to initiate a paging area update includes information related to locations of surrounding cells or base stations, and the neighboring cell determination unit calculates distances to the surrounding cells or base stations on the basis of information related to a location of the device moving in the air and the information related to the locations of the surrounding cells or base stations, and determines whether a candidate cell or base station selected by a cell selection procedure is a neighboring cell on the basis of the distances.

(4)

The wireless communication device according to (3) above, in which the information related to the location of the wireless communication device moving in the air is information related to a location measured using a location information sensor and the determination unit.

(5)

The wireless communication device according to any one of (1) to (4) above, in which an index related to the condition for the device moving in the air to initiate a paging area update includes a threshold related to received strength of a reference signal, and the neighboring cell determination unit determines whether a candidate cell or base station selected by a cell selection procedure is a neighboring cell on the basis of a comparison between received strength of a reference signal transmitted from the candidate cell or base station and the threshold.

(6)

The wireless communication device according to (5) above, in which the index related to the condition for the device moving in the air to initiate a paging area update further includes information related to an offset, and the neighboring cell determination unit further uses the information related to the offset in calculation of the received strength of the reference signal transmitted from the candidate cell or base station.

(7)

The wireless communication device according to any one of (1) to (6) above, in which an index related to the condition for the device moving in the air to initiate a paging area update includes a threshold related to a distance, and the neighboring cell determination unit calculates a distance to a candidate cell or base station selected by a cell selection procedure on the basis of received strength of a reference signal transmitted from the candidate cell or base station, and information related to transmission power of the reference signal acquired through the common information, and determines whether the candidate cell or base station is a neighboring cell on the basis of a comparison between the distance to the candidate cell or base station and the threshold related to the distance.

(8)

The wireless communication device according to (7) above, in which the index related to the condition for the device moving in the air to initiate a paging area update further includes information related to an offset, and the neighboring cell determination unit further uses the information related to the offset in the calculation of the distance to the candidate cell or base station.

(9)

The wireless communication device according to (8) above, in which the information related to the offset includes two or more values according to an altitude of the device moving in the air, and the neighboring cell determination unit selects one value from the information related to the offset on the basis of an altitude measured using the determination unit, and uses the selected value as the information related to the offset in the calculation of the distance to the candidate cell or base station.

(10)

The wireless communication device according to any one of (1) to (9) above, in which the condition for the device moving in the air to initiate a paging area update is a point of time when a set time has elapsed from a point of time when identification information of a different paging area is detected in a comparison between the identification information of the paging area acquired through the common information and identification information of a paging area for which an update was performed last time.

(11)

The wireless communication device according to any one of (1) to (10) above, in which the condition for the device moving in the air to initiate a paging area update is a point to which a set distance has been traveled from a point where identification information of a different paging area is detected in a comparison between the identification information of the paging area acquired through the common information and identification information of a paging area for which an update was performed last time.

(12)

The wireless communication device according to any one of (1) to (11) above, in which the determination unit performs the determination on the basis of an altitude measured using a barometer.

(13)

A communication device including:

a transmission processing unit that transmits, through common information, an index related to a condition for a wireless communication device moving in the air to initiate a paging area update, in addition to identification information of a paging area to which the device belongs; and a wireless communication unit that receives information regarding the paging area update from the wireless communication device.

(14)

The communication device according to (13) above, in which the condition for the wireless communication device moving in the air to initiate a paging area update is a case where it is determined that a candidate cell or base station selected by a cell selection procedure is a cell near the wireless communication device moving in the air.

(15)

A communication control method including:

determining by a device whether the device is a device moving on the ground or a device moving in the air;

determining whether or not identification information of a paging area acquired through common information transmitted from a base station is the same as identification information of a paging area for which an update was performed last time upon determination that the device is moving in the air; and determining presence or absence of need for a paging area update on the basis of a condition for initiating a paging area update upon determination that the device is moving in the air.

(16)

A communication control method including:

transmitting by a device, through common information, an index related to a condition for a wireless communication device moving in the air to initiate a paging area update, in addition to identification information of a paging area to which the device belongs; and receiving information regarding the paging area update from the wireless communication device.

REFERENCE SIGNS LIST

100 Terminal device
101 Reception unit
102 First antenna
103 Cell selection processing unit
104 SI detection unit
105 Altitude detection unit
106 Determination unit
107 Control unit
108 Neighboring cell determination unit
109 Location detection unit
110 Second antenna
200 Base station
200a Base station
200b Base station

The invention claimed is:

1. A wireless communication device comprising:
circuitry configured to:
determine whether the device is operated as aerial user equipment;
determine whether or not identification information of a paging area acquired through information transmitted from a base station equals identification information of a paging area for which an update was performed last time when the determination unit determines that the device is operated as the aerial user equipment; and
determine presence or absence of a need for a paging area update on a basis of a condition for initiating a paging area update when the determination unit determines that the device is operated as the aerial user equipment.

2. The wireless communication device according to claim 1, wherein
an index related to the condition for the device operated as the aerial user equipment to initiate the paging area update includes information related to locations of surrounding cells or base stations, and
the circuitry is configured to calculate distances to the surrounding cells or the base stations on a basis of information related to a location of the device operated as the aerial user equipment and the information related to the locations of the surrounding cells or the base stations, and determines whether a candidate cell or base station selected by a cell selection procedure is a neighboring cell on a basis of the distances.

3. The wireless communication device according to claim 2, wherein the information related to the location of the wireless communication device operated as the aerial user equipment is information related to a location measured using a location information sensor and the determination unit.

4. The wireless communication device according to claim 1, wherein
an index related to the condition for the device operated as the aerial user equipment to initiate the paging area update includes a threshold related to received strength of a reference signal, and
a neighboring cell determination unit determines whether a candidate cell or base station selected by a cell selection procedure is a neighboring cell on a basis of a comparison between the received strength of the reference signal transmitted from the candidate cell or base station and the threshold.

5. The wireless communication device according to claim 4, wherein
the index related to the condition for the device operated as the aerial user equipment to initiate the paging area update further includes information related to an offset, and
the neighboring cell determination unit further uses the information related to the offset in calculation of the received strength of the reference signal transmitted from the candidate cell or base station.

6. The wireless communication device according to claim 5, wherein
the information related to the offset includes two or more values according to an altitude of the device operated as the aerial user equipment, and
the neighboring cell determination unit selects one value from the information related to the offset on a basis of an altitude measured using the determination unit, and uses the selected value as the information related to the offset in the calculation of the received strength of the reference signal transmitted from the candidate cell or the base station.

7. The wireless communication device according to claim 5, wherein
the information related to the offset includes each value associated with identification information of surrounding cells or base stations, and the neighboring cell determination unit selects one value from the information related to the offset on a basis of the identification information, and uses the selected value as the information related to the offset in the calculation of the received strength of the reference signal transmitted from the candidate cell or the base station.

8. The wireless communication device according to claim 1, wherein an index related to the condition for the device operated as the aerial user equipment to initiate the paging area update includes a threshold related to a distance, and a neighboring cell determination unit calculates a distance to a candidate cell or base station selected by a cell selection procedure on a basis of received strength of a reference signal transmitted from the candidate cell or base station, and information related to transmission power of the reference signal acquired through the information, and determines whether the candidate cell or base station is a neighboring cell on a basis of a comparison between the distance to the candidate cell or base station and the threshold related to the distance.

9. The wireless communication device according to claim 8, wherein the index related to the condition for the device operated as the aerial user equipment to initiate the paging area update further includes information related to an offset, and the neighboring cell determination unit further uses the information related to the offset in the calculation of the distance to the candidate cell or base station.

10. The wireless communication device according to claim 9, wherein the information related to the offset includes two or more values according to an altitude of the device operated as the aerial user equipment, and the neighboring cell determination unit selects one value from the information related to the offset on a basis of an altitude measured using the determination unit, and uses the selected value as the information related to the offset in the calculation of the distance to the candidate cell or base station.

11. The wireless communication device according to claim 9, wherein the information related to the offset includes each value associated with identification information of surrounding cells or base stations, and the neighboring cell determination unit selects one value from the information related to the offset on a basis of the identification information, and uses the selected value as the information related to the offset in the calculation of the distance to the candidate cell or the base station.

12. The wireless communication device according to claim 1, wherein the condition for the device operated as the aerial user equipment to initiate the paging area update is a point of time when a set time has elapsed from a point of time when identification information of a different paging area is detected in a comparison between the identification information of the paging area acquired through the information and identification information of the paging area for which the update was performed last time.

13. The wireless communication device according to claim 12, wherein the set time is configured according to an altitude of the device operated as the aerial user equipment.

14. The wireless communication device according to claim 1, wherein the condition for the device operated as the aerial user equipment to initiate the paging area update is a point to which a set distance has been traveled from a point where identification information of a different paging area is detected in a comparison between the identification information of the paging area acquired through the information and identification information of the paging area for which the update was performed last time.

15. The wireless communication device according to claim 1, wherein the determination unit performs the determination on a basis of an altitude measured using a barometer.

16. A communication control method comprising:

determining by a device whether the device is a device operated as aerial user equipment;

determining whether or not identification information of a paging area acquired through information transmitted from a base station equals identification information of a paging area for which an update was performed last time upon the determination that the device is operated as the aerial user equipment; and determining presence or absence of need for a paging area update on a basis of a condition for initiating a paging area update upon determination that the device is operated as the aerial user equipment.

\* \* \* \* \*